April 26, 1932.  R. E. STEWART  1,855,617
VARIABLE SPEED INDUCTION MOTOR
Filed March 19, 1928  2 Sheets-Sheet 1
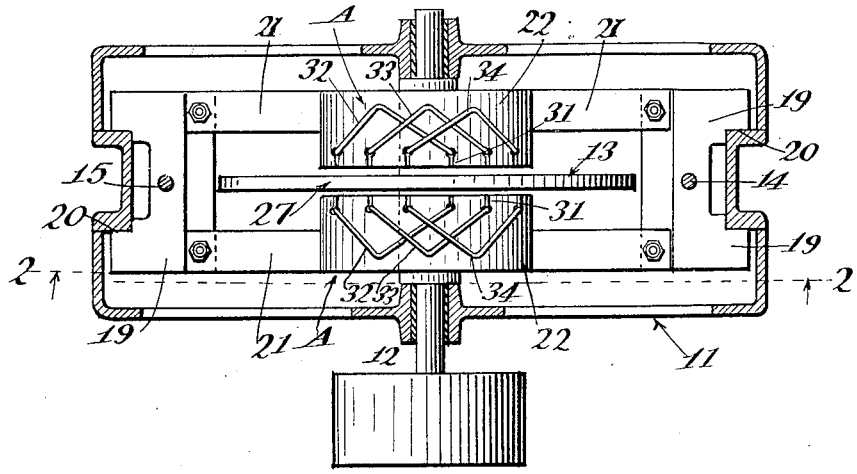
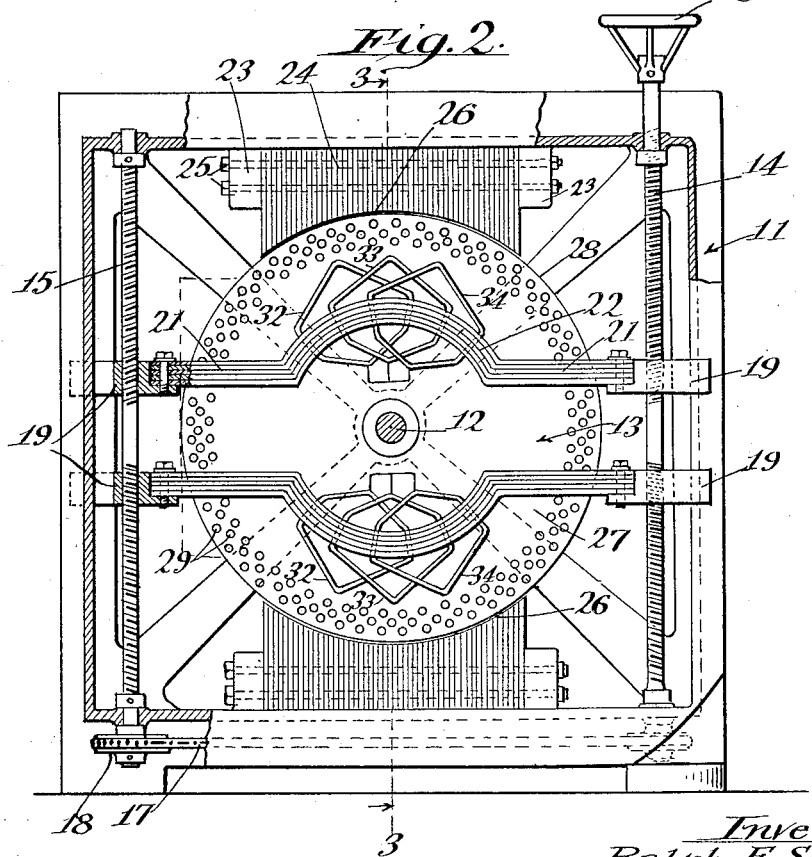
Inventor
Ralph E. Stewart
By Hazard and Miller
Attorneys

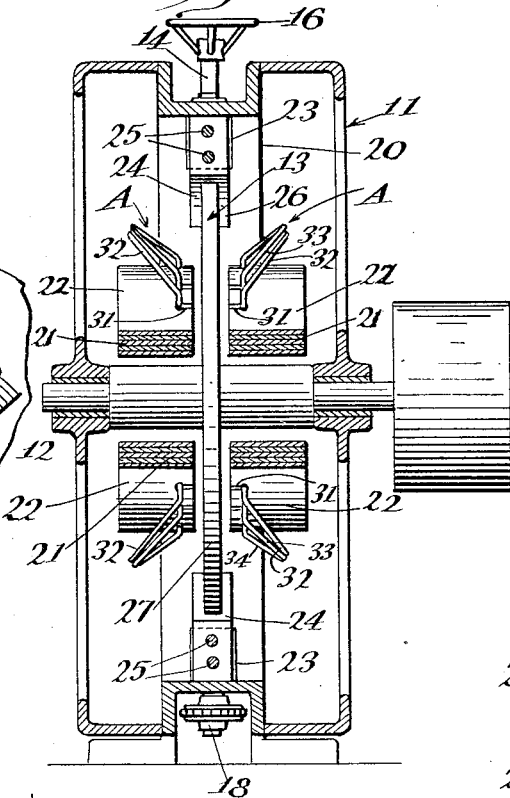
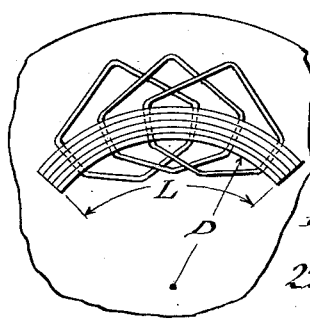
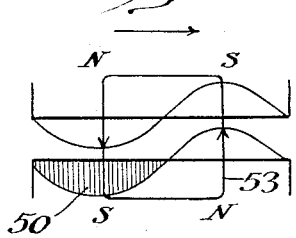
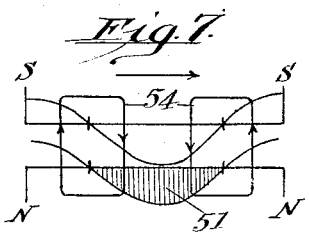
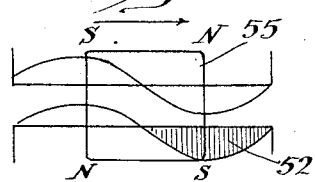
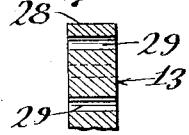
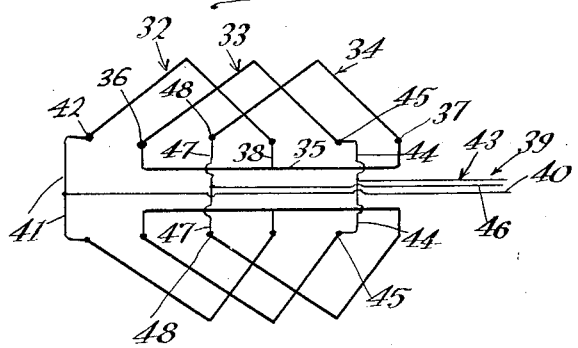

Patented Apr. 26, 1932

1,855,617

UNITED STATES PATENT OFFICE

RALPH E. STEWART, OF LOS ANGELES, CALIFORNIA

VARIABLE SPEED INDUCTION MOTOR

Application filed March 19, 1928. Serial No. 262,844.

My invention is a variable speed induction motor in which I use stator windings designed for polyphase currents and having the windings adjustable in relation to the radius of the rotor.

There has been a long desired want for an adjustable revolution-per-minute alternating current motor of the induction type; but the revolutions per minute of an ordinary induction motor are governed by the frequency per second of the circuit and the number of magnetic poles in the motor. Thus:

Presuming P = the number of magnetic poles in the motor,
$n$ = the cycles per second,
$S$ = the revolutions per minute.

The formula expressing $$S = \frac{120n}{P},$$

this is the speed of the revolving magnetic field, the actual speed of the motor is somewhat less, depending on the load. When the motor operates at speeds near that given by the formula the operation is very satisfactory, but when the speed is reduced to any great extent from the formula the operation becomes very poor owing to the electrical characteristics of induction motors, well known and explained in many text books.

From this it is seen that for an alternating current motor of the induction type to operate well, the conductors of the rotor must travel at approximately the same velocity as the revolving magnetic field.

My invention pertains to a polyphase alternating current induction motor, the speed of which may be adjusted within wide limits, the H. P. output remaining substantially constant at all speeds within the limits of the design and still maintain the condition of efficient operation. Such condition is that the conductors of the rotor travel at approximately the same speed as the magnetic field.

To attain this result I construct the stators for a polyphase alternating current so that the windings for each successive phase are spaced apart in a more or less circumferential arrangement relative to the rotor, and this causes a circumferential travel of the magnetic flux as each of the windings becomes energized in each cycle; and as cycles are continuously repeated there is a continual movement of the magnetic flux in the direction of the rotation of the rotor, but instead of the flux rotating around the axis of the rotor the movement of the flux extends the distance that the separate windings for each of the separate phases are spaced from the first to the last and then the flux returns to the first and repeats the cycle.

My invention will be more readily understood from the following description and drawings, in which:

Fig. 1 is a horizontal section through a polyphase variable speed induction motor in accordance with my design.

Fig. 2 is a vertical section taken substantially on the line 2—2 of Fig. 1 in the direction of the arrows.

Fig. 3 is a vertical section substantially on the line 3—3 of Fig. 2 in the direction of the arrows, showing the rotor in edge elevation.

Fig. 4 is a diagrammatic view showing the windings for a three-phase alternating current for the stators on opposite sides of the rotor.

Fig. 5 is a diagrammatic illustration of the above windings to illustrate some of the characteristics of my motor.

Figs. 6, 7, and 8 are diagrammatic views showing the travel of the magnetic field and the path of the magnetic flux in the stator segments of the motor during one cycle when supplied by 3 E. M. F. 120° apart.

Fig. 9 is a detailed transverse section of part of the rotor disc.

In constructing my invention I utilize a suitable frame 11 illustrated as being somewhat of a box-like construction in which the rotor shaft 12 is journaled on opposite sides and carries a disc-like rotor 13. Mounted on each side of the frame there are a pair of screws 14 and 15 each having right and left threads, having an operating handle 16 and connected for simultaneous movement by sprocket chains 17 and sprocket gears 18.

These screws have carrying blocks 19 suitably mounted to operate in guideways 20 of the frame; and secured to the upper and lower pair of these blocks there are supporting bars 21 which each have stator segments 22. Such segments are laminated as illustrated in Fig. 2. Secured to the top and bottom of the frame there are clamping plates 23 having a laminated structure 24 secured thereto by bolts 25. These laminated structures have the laminations vertical and have curved surfaces 26 concentric to the periphery of the rotor.

The rotor 13 is preferably of even thickness through the main body as indicated by the numeral 27, and adjacent its periphery 28 there are a large number of small holes 29. The object of this is to provide an annular section of the rotor disc with a part adjacent its periphery having a high electrical resistance compared to the remaining portion of the disc. (Note Fig. 9.)

The stator segments 22 are provided with a series of slots 31 and have the stator winding coils fitted therein. For instance, the coil 32 may be designated as for the first phase; the coil 33 as the second phase, and the coil 34 as the third phase for a three-phase alternating current. The stators may be designated as A—A on opposite sides of the rotor disc below the shaft. (Note Fig. 3.)

The wiring of the windings comprises a connection 35 uniting one end of the second-phase winding 33 and opposite end 37 of the third-phase winding 34. The end of the first-phase winding 32 is connected to this connection 35 as illustrated at 38. This makes the connections on one side of the stator. The three-phase wires are indicated at 39, which the wire 40 leads by branch connections 41 to the ends 42 of the first-phase winding 32 on the stators on opposite sides of the rotor.

The second-phase lead 43 has connections 44 to ends 45 of the second-phase winding 33. The third-phase lead 46 has connections 47 to the ends 48 of the third-phase winding 34.

In Fig. 5 I show a diagram of the stator and the coils mounted thereon indicating a position of the stator relative to the rotor disc.

In the following formula:

$S$ = the revolutions per minute of the disc,
$V$ = the velocity of the magnetic field in inches per minute,
$D$ = the distance from center of stator to center of shaft of rotor in inches,
$n$ = frequency of circuit in cycles per second,
$P$ = number of magnetic poles,
$l$ = length of stator in inches, Referring to the diagrams the coil grouping on the stator provides for two poles, although it can be four, six, eight or other suitable number of poles in multiples of two.

The velocity of the magnetic field may be considered as expressed by:

$$V = \frac{120nl}{P}, \text{ then } S = \frac{V}{2D\pi} \text{ or } \frac{60nl}{D\pi P}$$

It will therefore be seen that D can be varied to give various values of S, or revolutions per minute, while the portion of the rotor adjacent the stator has approximately the same velocity as the magnetic flux in the stator.

From this it can be seen that for a motor of this type the correct speed bears a definite relation to the dimensions of the stator, its distance from the center of rotation and the frequency of the circuit. It is impossible to run faster than the speed given by the formula for then the motor becomes an induction generator requiring power to run it. If the speed is much below that given by the formula the action of the motor is the same as an ordinary induction motor operating with excessive slippage.

Another object and advantage of my motor is that it can be started and stopped from within without any external starting equipment or opening or closing of the circuit. This is accomplished by providing the stationary metal laminated sections 24 as the stators are drawn outwardly clearing the periphery of the disc and positioned beside these laminated portions whereby the magnetic flux passes through such portions and has no action on the disc.

Another object and important characteristic of my invention has to do with the starting and running features; having the starting characteristics of a high resistance rotor with the running characteristics of a low resistance rotor. This is accomplished by the annular ring of high electrical resistance compared to the rest of the disc so that when the stators are moved from the stationary iron laminated sections towards the center of the disc they first pass over the high resistance ring around the edge of the disc in which condition the motor starts as a motor having a high resistance rotor giving great starting torque.

But when the stators are moved toward the center of the disc this high resistance strip is passed and a low resistance section of the disc is reached when the motor operates as a motor having a low resistance rotor motor; having a high pull out torque and small slippage.

In Figs. 6, 7, and 8 I indicate the progress of the magnetic flux between the stators on opposite sides of the rotor disc as the current is passing through each of the windings of the polyphase circuit. The shaded sections 50, 51, and 52 indicate the progressive change in the strength of one of the poles and the rectangular diagrams 53, 54, and 55 may be considered as indicating the direction and path of the magnetic flux.

I construct the stator segments 22 in an arcuate shape forming a compromised curve with circular parts of the rotor, so that when these segments are moved towards and from the center, that is the shaft, they approximate a radial movement. As the stator segments are rapid manifestly an absolute radial movement can not be obtained, but the movement forms an approximation to a radial movement yet developing the different speeds of the rotor.

It is to be understood that the opposite pair of polyphase windings on both sides of the rotor are constructed and energized so that the magnetic flux developed is additive.

Various changes may be made in the principles of my invention without departing from the spirit thereof, as set forth in the description, drawings and claims.

I claim:

1. An induction motor comprising a disc rotor with a high electrical resistance strip about its edge; one or more pairs of stators with polyphase windings grouped on them so that the coils on adjacent stator sides are of the same phase and additive magnetically, adjustable radially with respect to the center of the disc and one or more stationary iron laminated sections at the edge of the disc over which the stators can be drawn.

2. An induction motor, comprising in combination a disk-like rotor, a stator having an arcuately curved metal segment, a polyphase winding mounted on said segment with the phase windings spaced apart in a circumferential direction of said segment, means to energize said windings whereby a moving magnetic flux is developed following the curvature of the said segment, with a magnetic metal structure positioned adjacent the periphery of the rotor, and means to move said segment outwardly beyond the periphery of the rotor to position said segment beside the metal structure to remove the magnetic flux from influencing the rotor.

3. An induction motor comprising in combination a disk type rotor, a stationary magnetic structure positioned adjacent the periphery of said rotor, a stator and means to move said stator substantially radially in regard to the center of rotation of the rotor beyond the periphery of the rotor to position said stator beside said magnetic structure.

4. An induction motor having a disk type rotor, a pair of stators each having an arcuate metal segment on opposite sides of the rotor, a polyphase winding on each of the segments with the phase windings spaced apart in the circumferential direction of said segment, means to energize each of the windings simultaneously whereby an additive magnetic flux is developed, such flux traveling in a circumferential direction of the said segments, a laminated magnetic metal block positioned adjacent the periphery of the rotor, and means to move the pair of segments outwardly to position same on opposite sides of said block, thereby removing the magnetic influence from the rotor.

5. An induction motor having a disk type rotor, a pair of stators, a stationary magnetic metal block positioned adjacent the periphery of the rotor, and means to move the pair of stators radially to position the same outside the periphery of the rotor and beside the said block.

6. An induction motor having a disk type rotor, a stationary block of magnetic material positioned adjacent the periphery of the rotor, a stator shiftable radially of the rotor axis, to position the same adjacent the side face of the rotor or adjacent the side face of the metal block.

7. An induction motor having a disk-like rotor, a laminated block of magnetic material positioned adjacent the periphery of said disk-like rotor, a stator, means to shift the stator from a position adjacent the rotor to a position adjacent the said block, the stator having an arcuate metal segment with polyphase windings, the said windings being distributed in the circumferential direction of the said segment.

8. An induction motor having a disk type rotor, a block of magnetic material positioned adjacent the periphery of the rotor, a stator shiftable radially in regard to the axis of the rotor to position the same adjacent the side face of the rotor or adjacent the side face of the metal block, the rotor having an annular portion adjacent its periphery of considerably higher electrical resistance than the remaining portion of the rotor.

9. An induction motor having a disk type rotor, a stationary block of magnetic material positioned adjacent the periphery of the rotor, a stator shiftable radially of the rotor axis to position the stator adjacent the side face of the rotor or adjacent the side face of the metal block, the stator having an arcuate metal segment with polyphase windings.

In testimony whereof I have signed my name to this specification.

RALPH E. STEWART.